(12) United States Patent
Amano et al.

(10) Patent No.: US 10,949,423 B2
(45) Date of Patent: Mar. 16, 2021

(54) OPERATION MANAGEMENT DEVICE, OPERATION MANAGEMENT METHOD, AND OPERATION MANAGEMENT SYSTEM

(71) Applicant: HITACHI, LTD., Tokyo (JP)

(72) Inventors: Koji Amano, Tokyo (JP); Katsuhito Shimizu, Tokyo (JP); Wataru Sasaki, Tokyo (JP); Hiroshi Suzuki, Tokyo (JP); Yoshiyuki Ichioka, Ibaraki (JP)

(73) Assignee: HITACHI, LTD., Tokyo (JP)

( * ) Notice: Subject to any disclaimer, the term of this patent is extended or adjusted under 35 U.S.C. 154(b) by 224 days.

(21) Appl. No.: 16/300,077

(22) PCT Filed: Mar. 16, 2017

(86) PCT No.: PCT/JP2017/010786
§ 371 (c)(1),
(2) Date: Nov. 9, 2018

(87) PCT Pub. No.: WO2017/195464
PCT Pub. Date: Nov. 16, 2017

(65) Prior Publication Data
US 2019/0179814 A1     Jun. 13, 2019

(30) Foreign Application Priority Data

May 13, 2016 (JP) .............................. JP2016-096988

(51) Int. Cl.
| | |
|---|---|
| *G06F 16/245* | (2019.01) |
| *H04Q 9/00* | (2006.01) |
| *G06F 16/00* | (2019.01) |
| *G06F 13/00* | (2006.01) |
| *G06F 9/445* | (2018.01) |
| *G06F 16/22* | (2019.01) |

(Continued)

(52) U.S. Cl.
CPC ............ *G06F 16/245* (2019.01); *G06F 9/445* (2013.01); *G06F 9/48* (2013.01); *G06F 13/00* (2013.01);

(Continued)

(58) Field of Classification Search
CPC .................................................... G06F 16/245
See application file for complete search history.

(56) References Cited

U.S. PATENT DOCUMENTS 6,067,477 A      5/2000 Wewalaarachchi et al.
6,477,434 B1 *  11/2002 Wewalaarachchi .. G05B 19/418
                                                        700/83

(Continued)

FOREIGN PATENT DOCUMENTS

JP     2002-502072 A     1/2002
JP     2005-295130 A    10/2005

(Continued)

OTHER PUBLICATIONS

Development of Real-Time SGL Refinement Unit Dedicated to Manufacturing Facility Journal of Information Processing Society of Japan, Database vol. 2 No. 2 pp. 137 to 146 (Jun. 2009).

(Continued)

*Primary Examiner* — Van H Oberly
(74) *Attorney, Agent, or Firm* — Mattingly & Malur, PC

(57) ABSTRACT

Control facilities and incidental facilities in fields are flexibly managed. Since identification information enabling to identify uniquely information regarding control facilities of which design timing and architectures are mutually different or facilities incidental to the control facilities is encoded, pieces of identification information are coupled and uniqueness is guaranteed. Further, a parent-child relation between identifiers is constructed and the identifiers are structured as a tree structure based on the structure of the control facilities. A control facility operation management device manages combination of the structured identifiers and information of management target or combination of the structured identification information and identification information of a database.

13 Claims, 12 Drawing Sheets

(51) Int. Cl.
*G06F 16/25* (2019.01)
*G06F 9/48* (2006.01)
*G06F 13/16* (2006.01)

(52) U.S. Cl.
CPC .............. *G06F 13/16* (2013.01); *G06F 16/00* (2019.01); *G06F 16/2246* (2019.01); *G06F 16/25* (2019.01); *H04Q 9/00* (2013.01); *G06F 2213/16* (2013.01)

(56) References Cited

U.S. PATENT DOCUMENTS

2005/0120004 A1* 6/2005 Stata ................. G06F 16/31
2005/0289467 A1 12/2005 Imhof et al.
2009/0055765 A1 2/2009 Donaldson et al.
2012/0117226 A1 5/2012 Tanaka et al.

FOREIGN PATENT DOCUMENTS

| | | |
|---|---|---|
| JP | 2008-186401 A | 8/2008 |
| JP | 4300149 B | 7/2009 |
| JP | 2012-099048 A | 5/2012 |
| WO | 2011/074362 A1 | 6/2011 |

OTHER PUBLICATIONS

International Search Report of PCT/JP2017/010786 dated Apr. 25, 2017.
Extended European Search Report received in corresponding European Application No. 17795825.3 dated Jan. 7, 2020.

* cited by examiner

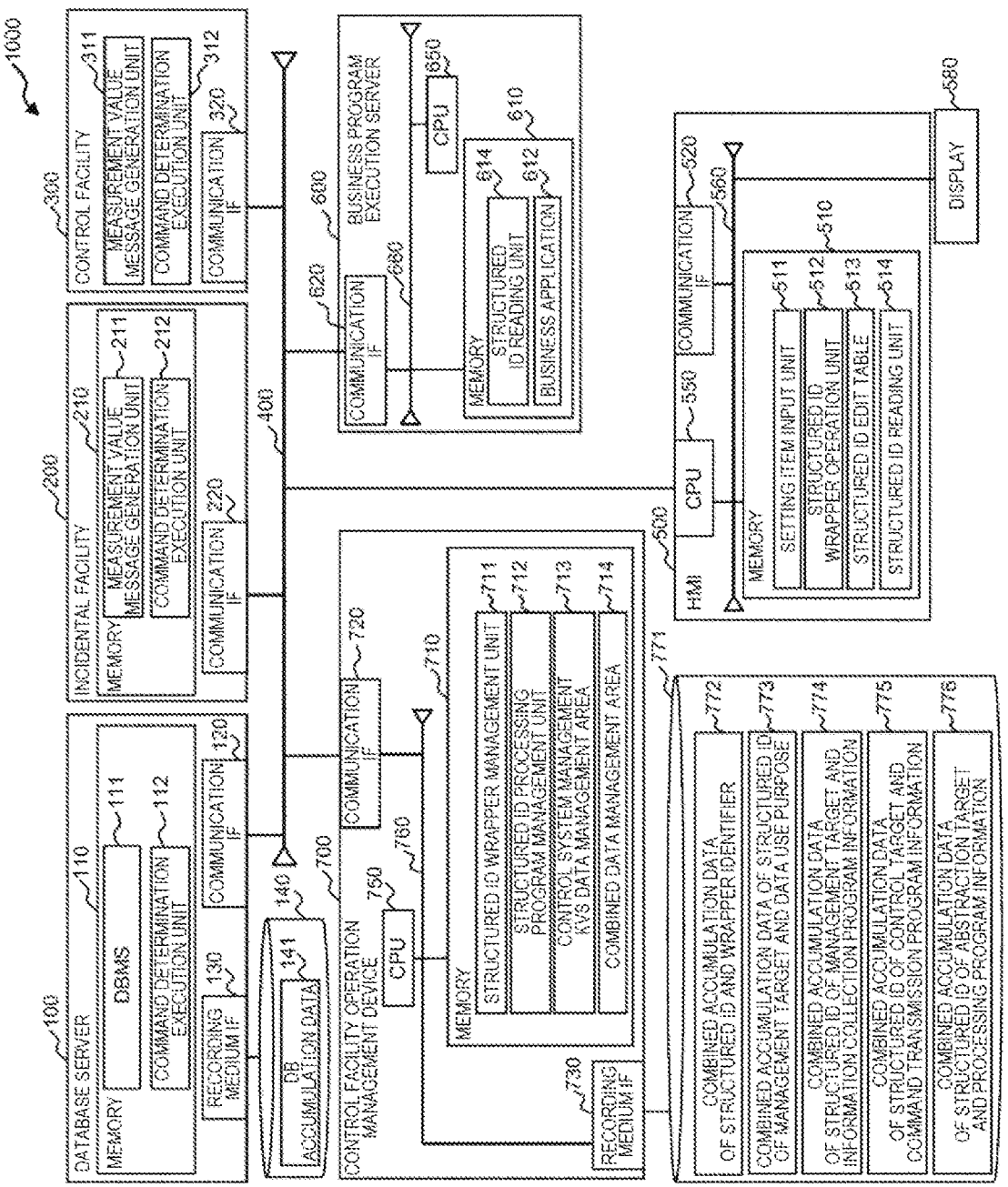
[FIG. 1]

[FIG. 2]
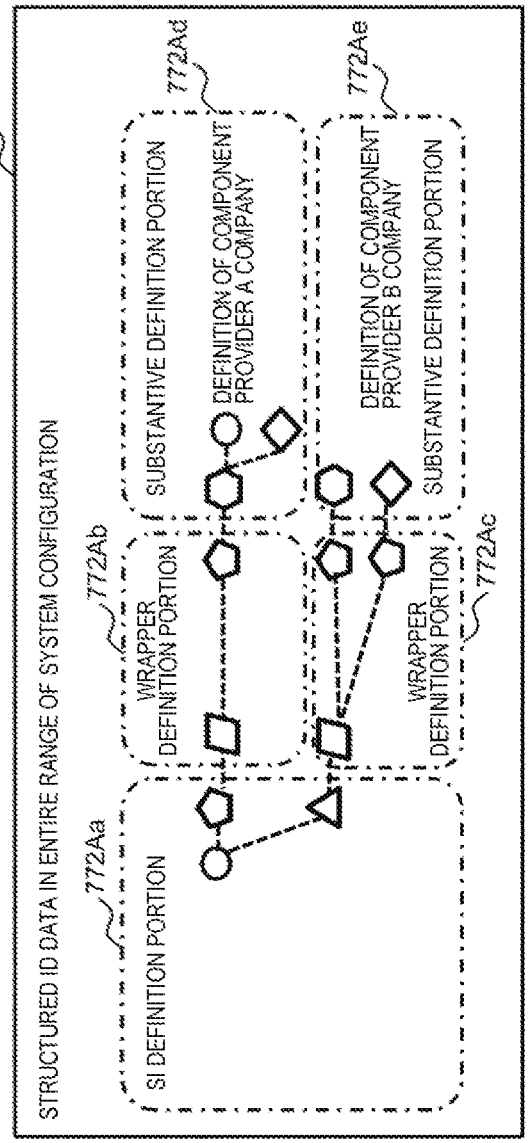

[FIG. 3]

| SI DEFINITION PORTION | WRAPPER DEFINITION PORTION | SUBSTANTIVE DEFINITION PORTION |
|---|---|---|
| | ENTIRE SYSTEM | |
| ENTIRE SYSTEM/ | | JAPAN |
| ENTIRE SYSTEM/JAPAN/PLANT A/ | PLANT MODEL A | A COMPANY PLANT |
| ENTIRE SYSTEM/JAPAN/PLANT B/ | PLANT MODEL B | B COMPANY PLANT |
| ENTIRE SYSTEM/JAPAN/PLANT A/PLANT MODEL A/ A COMPANY PLANT/DEVICE A/ | THERMOMETER MODEL A | A COMPANY THERMOMETER |
| ENTIRE SYSTEM/JAPAN/PLANT A/PLANT MODEL B/ B COMPANY PLANT/DEVICE B/ | THERMOMETER MODEL B | B COMPANY THERMOMETER |
| ENTIRE SYSTEM/JAPAN/PLANT C/PLANT MODEL A/ A COMPANY PLANT/DEVICE A/ | THERMOMETER MODEL A | A COMPANY THERMOMETER |
| ENTIRE SYSTEM/JAPAN/PLANT A/PLANT MODEL A/ A COMPANY PLANT/DEVICE A/THERMOMETER MODEL A/ A COMPANY THERMOMETER | FAILURE MODEL A | /FAILURE ID-α |
| ENTIRE SYSTEM/JAPAN/PLANT A/PLANT MODEL B/ B COMPANY PLANT/DEVICE B/THERMOMETER MODEL B/ B COMPANY THERMOMETER | FAILURE MODEL B | /FAILURE ID-β |
| ENTIRE SYSTEM/JAPAN/PLANT C/ | PLANT MODEL A | A COMPANY PLANT |
| ENTIRE SYSTEM/JAPAN/PLANT C/PLANT MODEL A/ A COMPANY PLANT/DEVICE A/ | THERMOMETER MODEL A | A COMPANY THERMOMETER |
| ENTIRE SYSTEM/JAPAN/PLANT D/ | PLANT MODEL A | A COMPANY PLANT |
| ENTIRE SYSTEM/JAPAN/PLANT D/PLANT MODEL A/ A COMPANY PLANT/DEVICE A/ | THERMOMETER MODEL A | D COMPANY THERMOMETER |
| ENTIRE SYSTEM/JAPAN/PLANT D/PLANT MODEL A/ A COMPANY PLANT/DEVICE A/ | THERMOMETER MODEL D | D COMPANY THERMOMETER |

[FIG. 4]

(A) ENTIRE SYSTEM/JAPAN/PLANT A/PLANT MODEL B/B COMPANY PLANT/DEVICE B/ THERMOMETER MODEL B/B COMPANY THERMOMETER (B) ENTIRE SYSTEM/*/PLANT MODEL B/*/THERMOMETER MODEL B/*

(C) ENTIRE SYSTEM/*/PLANT MODEL B/*

[FIG. 5]

| WRAPPER DEFINITION PORTION 776a | SUBSTANTIVE DEFINITION PORTION 776b | PROCESSING PROGRAM 776c | |
|---|---|---|---|
| PLANT MODEL A | A COMPANY PLANT | ABSTRACTION PROCESSING PROGRAM A | ~7761 |
| THERMOMETER MODEL A | D COMPANY THERMOMETER | UNIT SYSTEM TRANSFORMATION PROGRAM A | ~7762 |
| FAILURE MODEL A | FAILURE ID-α | FAILURE SEVERITY DETERMINATION PROGRAM A | ~7763 |
| FAILURE MODEL B | FAILURE ID-β | FAILURE SEVERITY DETERMINATION PROGRAM B | ~7764 |

| STRUCTURED ID 774a | INFORMATION COLLECTION PROGRAM 774b | |
|---|---|---|
| ENTIRE SYSTEM/JAPAN/PLANT A/PLANT MODEL A/ A COMPANY PLANT/DEVICE A/THERMOMETER MODEL A/ A COMPANY THERMOMETER | FIELD DEVICE QUERY PROGRAM | ~7741 |
| ENTIRE SYSTEM/JAPAN/PLANT A/PLANT MODEL B/ B COMPANY PLANT/DEVICE B/THERMOMETER MODEL B/ B COMPANY THERMOMETER | DB QUERY SQL EXECUTION PROGRAM | ~7742 |
| ENTIRE SYSTEM/JAPAN/PLANT A/PLANT MODEL B/ B COMPANY PLANT/DEVICE B/THERMOMETER MODEL B/ B COMPANY THERMOMETER | IoT SENSOR INFORMATION STREAM PROGRAM | ~7743 |

| STRUCTURED ID 775a | COMMAND TRANSMISSION PROGRAM 775b | |
|---|---|---|
| ENTIRE SYSTEM/JAPAN/PLANT A/PLANT MODEL A/ A COMPANY PLANT/DEVICE A/ | CONTROL COMMAND TRANSMISSION PROGRAM | ~7751 |
| ENTIRE SYSTEM/JAPAN/PLANT A/PLANT MODEL B/ B COMPANY PLANT/DEVICE B/ | DB WRITING SQL EXECUTION PROGRAM | ~7752 |
| ENTIRE SYSTEM/JAPAN/PLANT C/PLANT MODEL A/ A COMPANY PLANT/DEVICE A/ | IoT SENSOR OPERATION CHANGE PROGRAM | ~7753 |

| STRUCTURED ID | STRUCTURED ID DATA OF DATA USE PURPOSE |
|---|---|
| ENTIRE SYSTEM/JAPAN/PLANT A/PLANT MODEL A/ A COMPANY PLANT/DEVICE A/ THERMOMETER MODEL A | "ENTIRE SYSTEM/SCREEN/ONE-WEEK MOVING AVERAGE PROCESS," "ENTIRE SYSTEM/BUSINESS PROGRAM A" |
| ENTIRE SYSTEM/JAPAN/PLANT A/[PlantModel-B]/ B COMPANY PLANT/DEVICE B/ THERMOMETER MODEL B | ENTIRE SYSTEM/ SCADA DISPLAY/BAR GRAPH |

[FIG. 9]

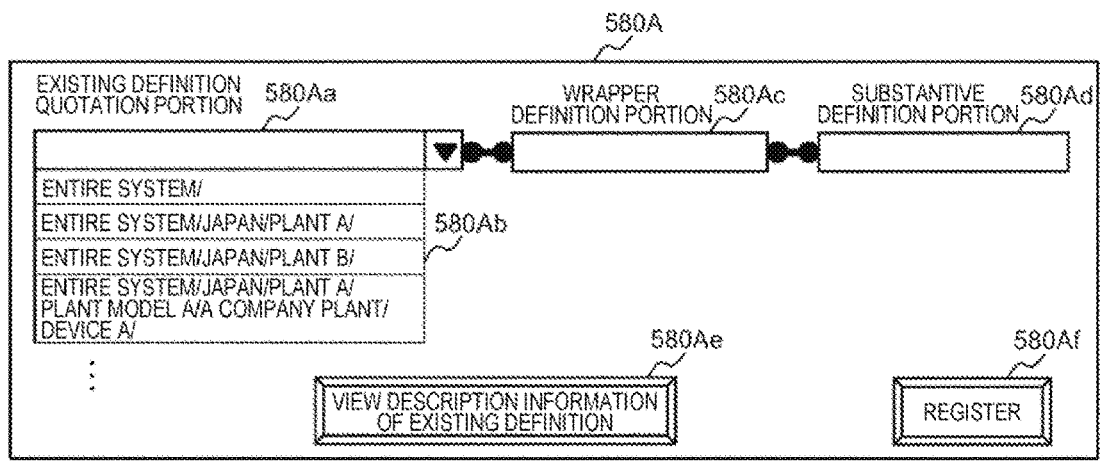

[FIG. 10]

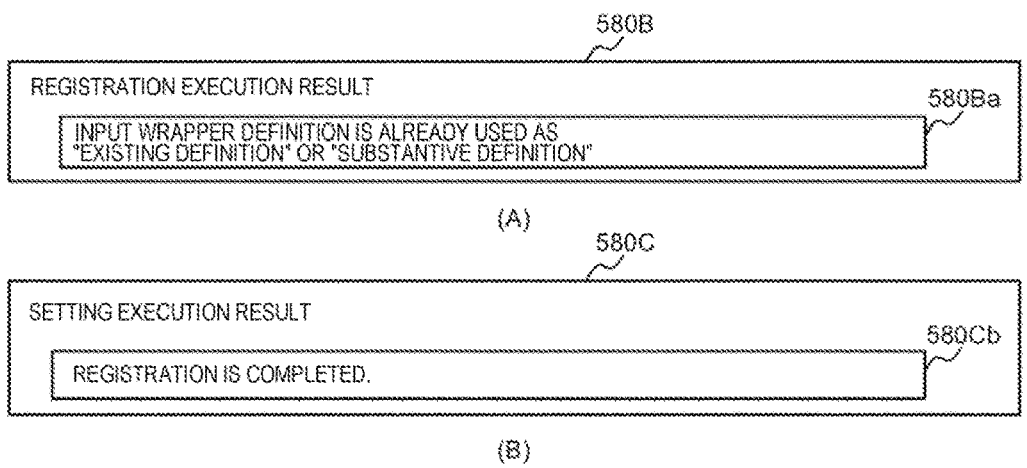

[FIG. 11]
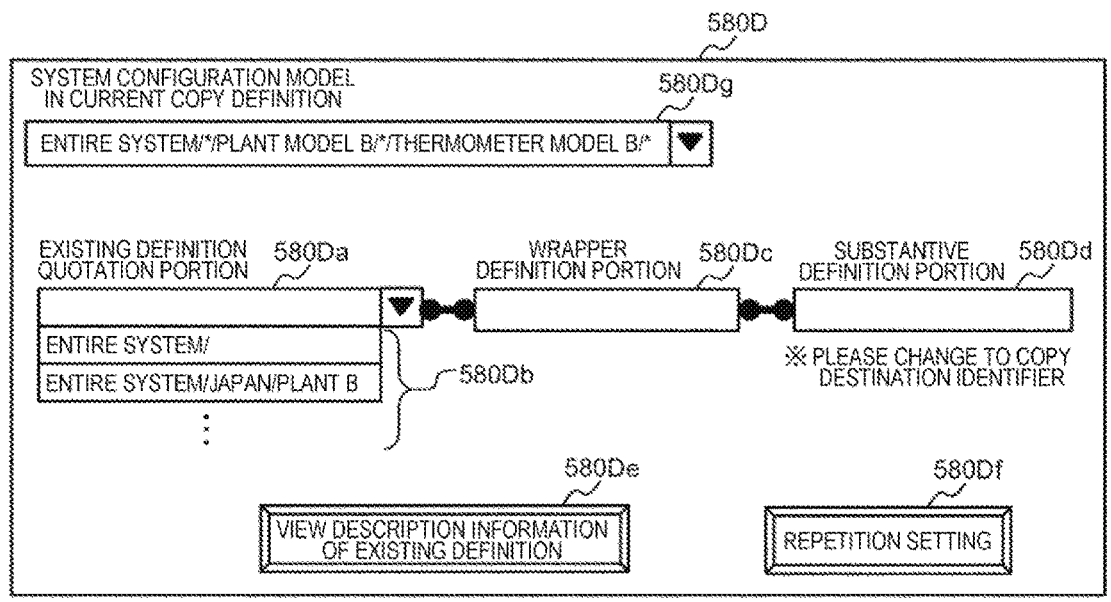
[FIG. 12]
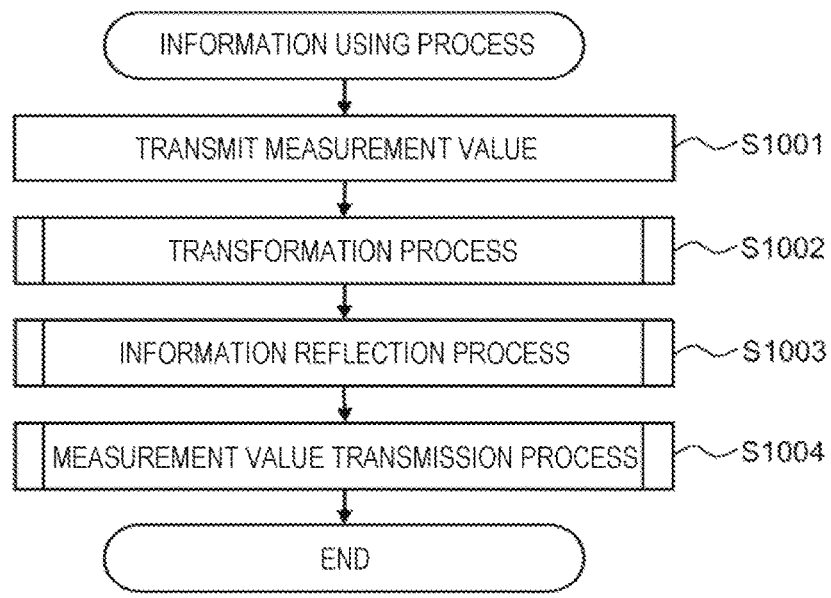

[FIG. 13]
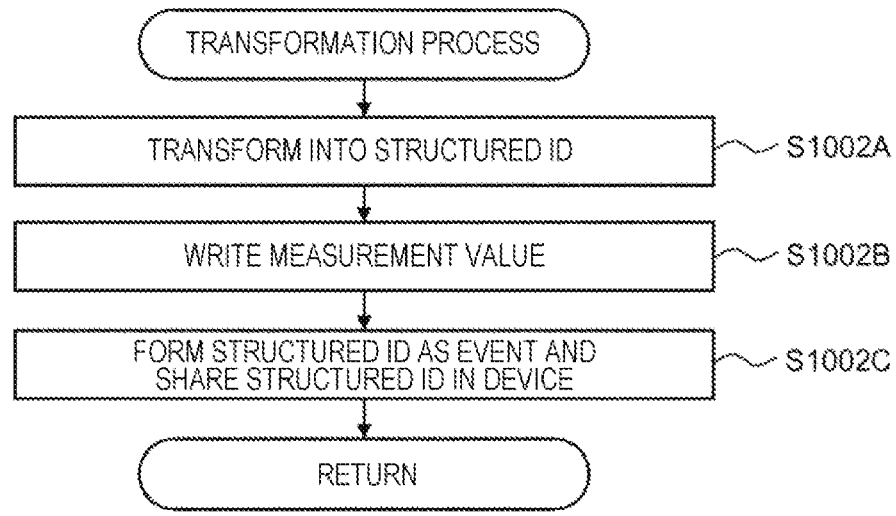
[FIG. 14]
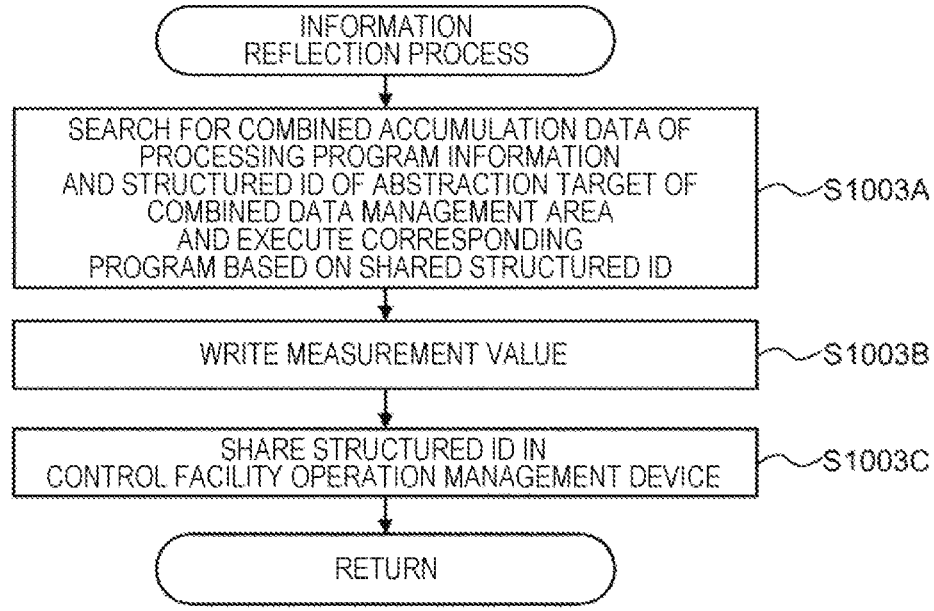

[FIG. 15]
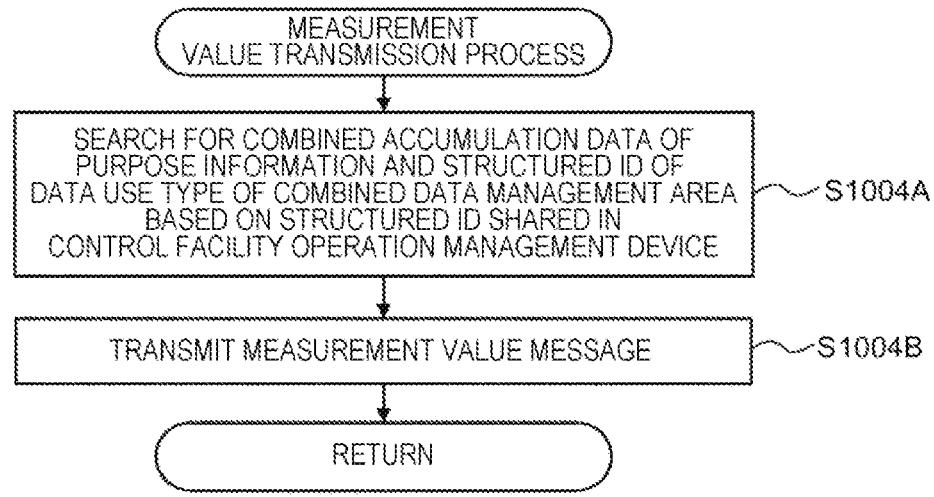
[FIG. 16]
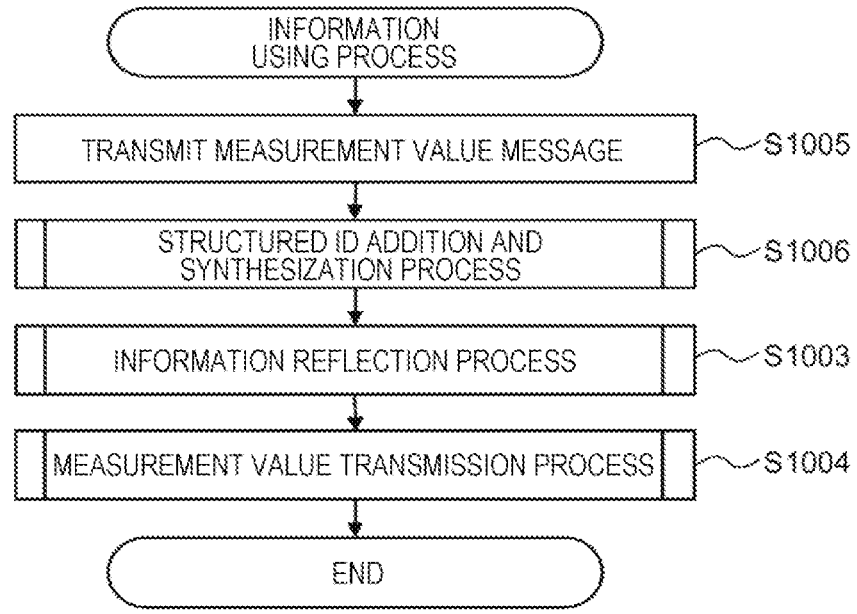

[FIG. 17]
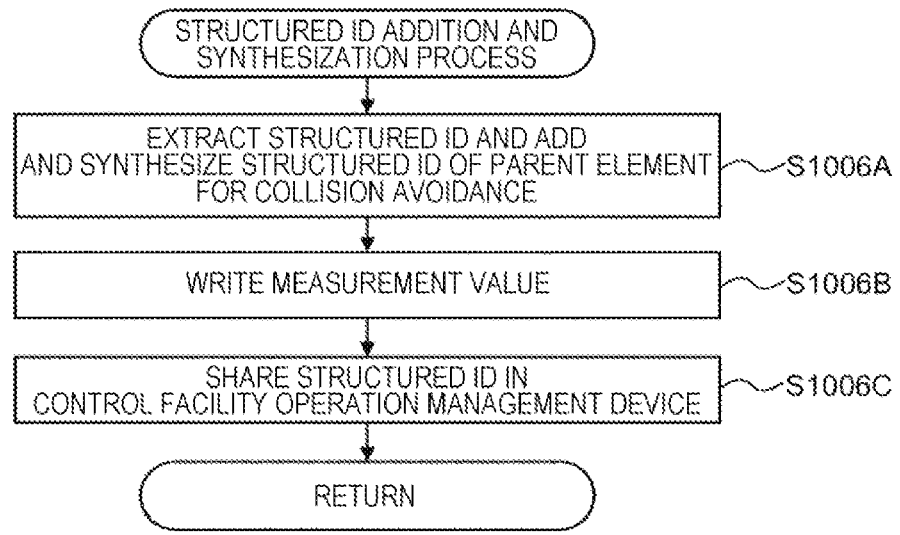
[FIG. 18]
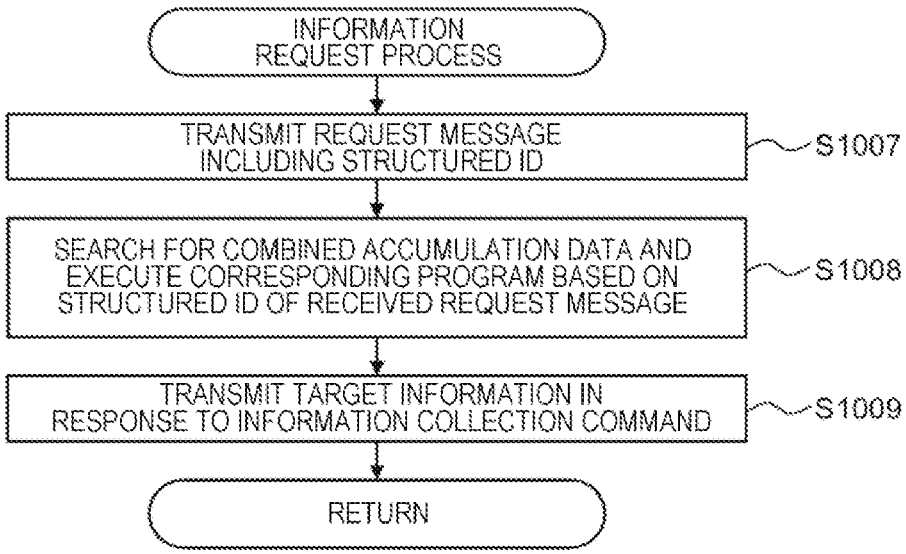

[FIG. 19]
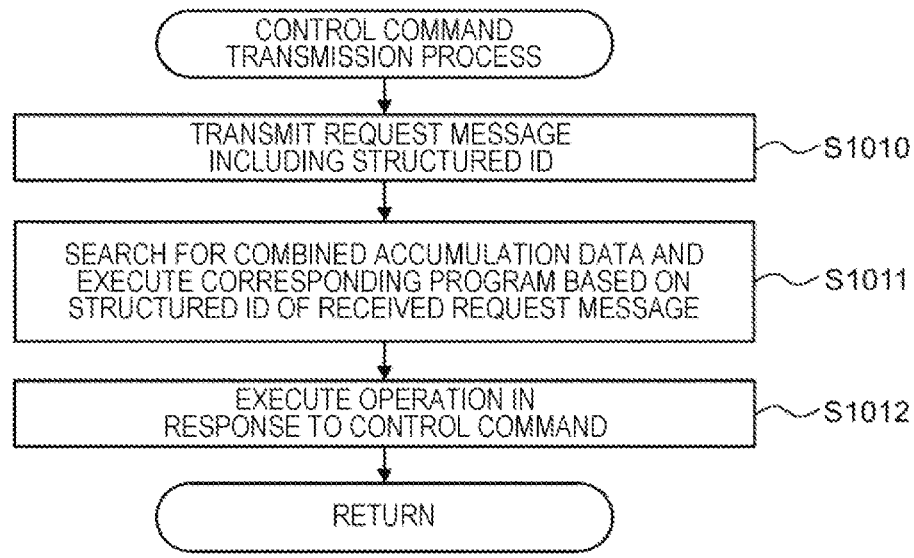
[FIG. 20]
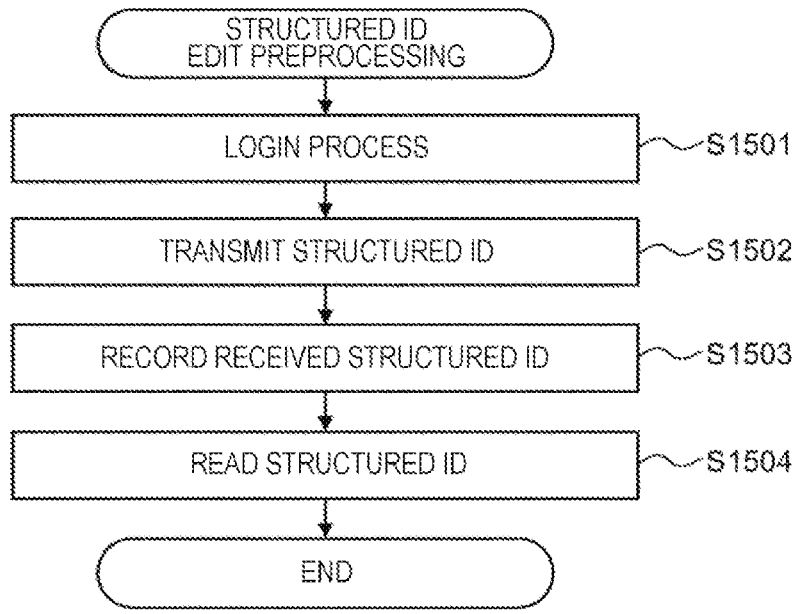

[FIG. 21]
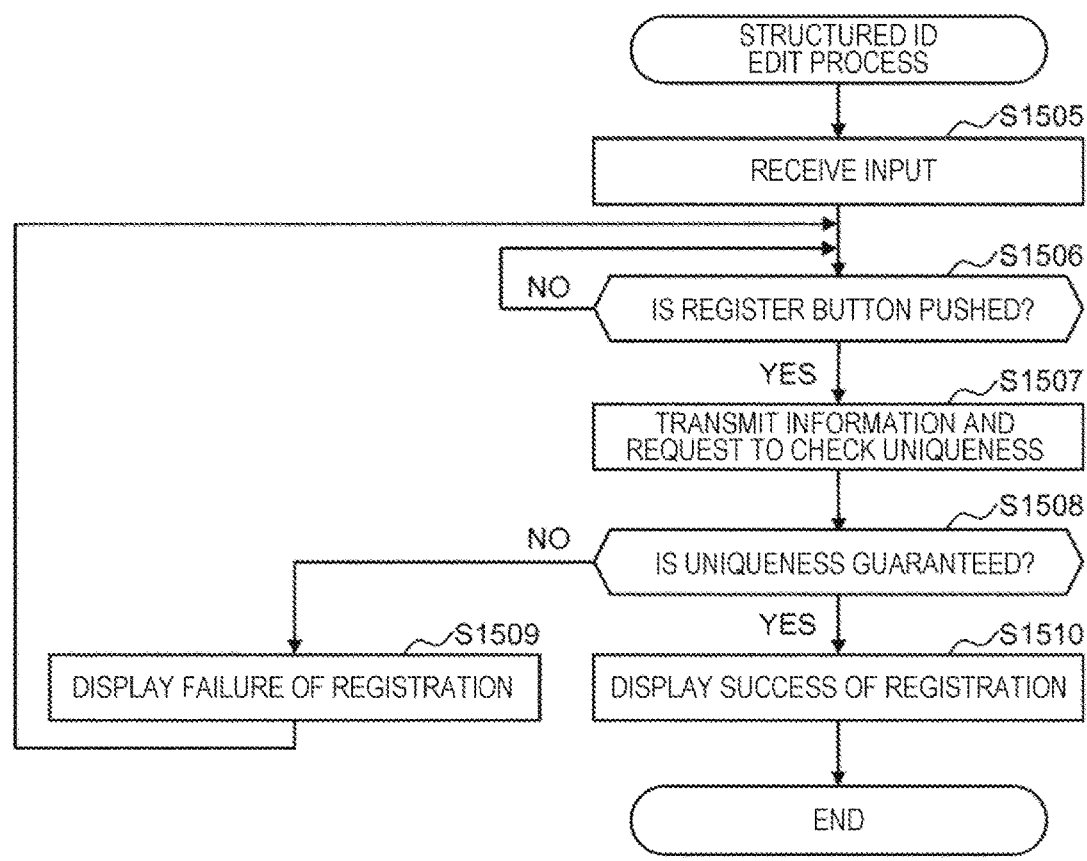

[FIG. 22]
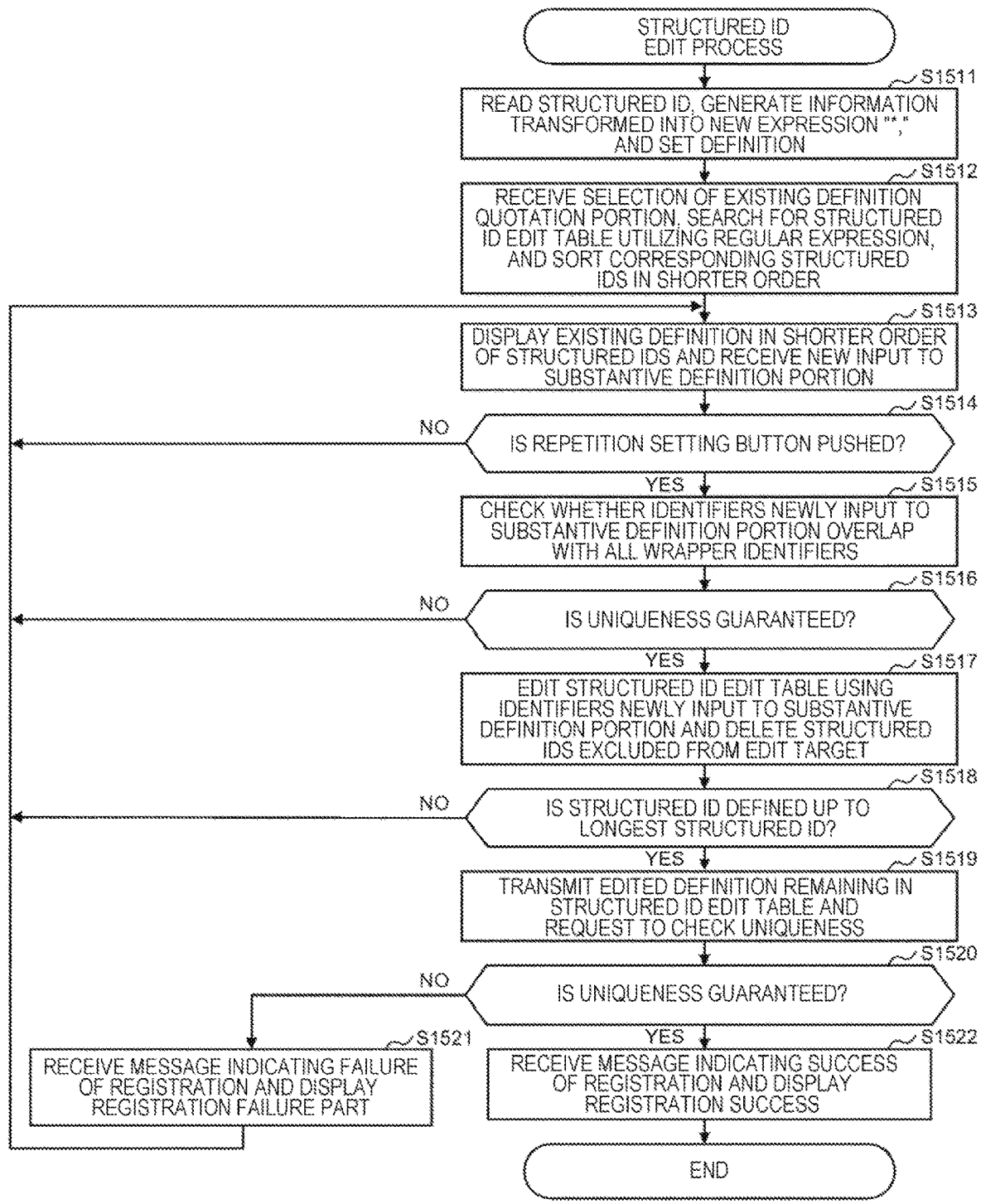

OPERATION MANAGEMENT DEVICE, OPERATION MANAGEMENT METHOD, AND OPERATION MANAGEMENT SYSTEM

TECHNICAL FIELD

The present invention relates to an operation management device, an operation management method, and an operation management system, and more particularly, to an operation management device, an operation management method, and an operation management system for unitarily managing information from control facilities and information from facilities incidental to the control facilities.

BACKGROUND ART

In recent years, technologies have been developed for high reliability of system operations. In system operation management systems of the related art, information is managed using relational databases (hereinafter abbreviated to "databases") in regard to control facilities in fields and service management platforms (hereinafter "control facilities" will be exemplified) (see PTL 1 and NPL 1). That is, in system operation management systems of the related art, based on information transmitted from sensors or the like serving as facilities incidental to control facilities in fields, business application programs prepared in advance according to fields distribute the received information to intermediate layers or lower layers, store the information in storage devices, and manage control facilities or the like in the fields according to combinations of the information.

CITATION LIST

Patent Literature

PTL 1: Japanese Patent No. 4300149

Non-Patent Literature

NPL 1: "Development of Real-Time SGL Refinement Unit Dedicated to Manufacturing Facility" Journal of Information Processing Society of Japan, Database Vol. 2 No. 2 p.p. 137 to 146 (June 2009).

SUMMARY OF INVENTION

Technical Problem

In system operations of the related art, information necessary to manage control facilities or the like in fields is managed using databases, and many business application programs described above involve design of databases and are developed in close association with databases. Therefore, specifications of systems may not be changed according to changes in the control facilities or the like in the fields and it was difficult to flexibly manage the control facilities or the like in the fields.

The invention is devised in view of the above circumstances and an object of the invention is to provide an operation management device, an operation management method, and an operation management system capable of flexibly managing control facilities in field and facilities incidental to the control facilities.

Solution to Problem

To solve the above-mentioned problems, an operation management device according to an aspect of the invention includes: an identification information management unit that manages physical and logic inclusion relations of constituent elements including control facilities and incidental facilities that form a system as respective pieces of structured identification information represented by a tree structure including each piece of logic inclusion identification information associated with each piece of configuration information indicating each of the constituent elements, and manages uniqueness between the pieces of structured identification information; a combination management unit that manages a combination of each application program corresponding to each of the constituent elements and the each piece of logic inclusion identification information corresponding to the each piece of constituent information indicating each of the constituent elements; and a program execution unit that gives a query to the combination management unit in response to a request including one piece of logic inclusion identification information to acquire one piece of structured identification information including the one piece of logic inclusion identification information, specifies one application program based on one constituent element corresponding to the one piece of structured identification information, and executes the specified one application program.

An operation management method according to another aspect of the invention executes: an identification information management step of managing physical and logic inclusion relations of constituent elements including control facilities and incidental facilities that form a system as respective pieces of structured identification information represented by a tree structure including each piece of logic inclusion identification information associated with each piece of configuration information indicating each of the constituent elements, and managing uniqueness between the pieces of structured identification information, by an identification information management unit; a combination management step of managing a combination of each application program corresponding to the each piece of the constituent elements and each of logic inclusion identification information corresponding to the each piece of constituent information indicating each of the constituent elements, by a combination management unit; and a program execution step of giving a query to the combination management unit in response to a request including one piece of logic inclusion identification information to acquire one piece of structured identification information including the one piece of logic inclusion identification information, specifying one application program based on one constituent element corresponding to the one piece of structured identification information, and executing the specified one application program, by a program execution unit.

An operation management system according to still another aspect of the invention includes: an operation management device including an identification information management unit that manages physical and logic inclusion relations of constituent elements including control facilities and incidental facilities that form a system as respective pieces of structured identification information represented by a tree structure including each piece of logic inclusion identification information associated with each piece of configuration information indicating each of the constituent elements, and manages uniqueness between the pieces of structured identification information, a combination management unit that manages a combination of each application program corresponding to each of the constituent elements and the each piece of logic inclusion identification information corresponding to the each piece of constituent information indicating each of the constituent elements, and a program execution unit that gives a query to the combination management unit in response to a request including one piece of logic inclusion identification information to acquire one piece of structured identification information including the one piece of logic inclusion identification information, specifies one application program based on one constituent element corresponding to the one piece of structured identification information, and executes the specified one application program; and a user side device that requests structured identification information, wherein the identification information management unit includes a similarity search execution unit that compares the structured identification information requested by the user side device to the plurality of pieces of managed structured identification information and examines similarity therebetween information, and an information introduction unit that permits disclosure of the specific structured identification information to the user side device on condition of charge when there is the specific structured identification information similar to the structured identification information requested by the user side device among the plurality of pieces of managed identification information as a result of searching by the similarity search execution unit.

Advantageous Effects of Invention

According to the invention, it is possible to flexibly manage control facilities in field and facilities incidental to the control facilities.

BRIEF DESCRIPTION OF DRAWINGS

FIG. 1 is a block diagram illustrating an overall configuration example of a control facility operation management system according to a first embodiment.

FIG. 2 is a conceptual diagram illustrating definition of a structured ID capable of managing consistency of the entire range representing a system configuration.

FIG. 3 is a diagram illustrating an example of a table configuration of combined accumulation data of the structured ID and a wrapper.

FIG. 4 is a diagram illustrating an example of a regular expression made to distinguish the wrapper identifier from a substantive identifier.

FIG. 5 is a diagram illustrating an example of a table of combined accumulation data of a structured ID of an abstraction target and processing program information.

FIG. 6 is a diagram illustrating an example of a table of combined accumulation data of a structured ID of a management target and information collection program information.

FIG. 7 is a diagram illustrating an example of a table of combined accumulation data of a structured ID of a control target and command transmission program information.

FIG. 8 is a diagram illustrating an example of a table of combined accumulation data of a structured ID of a management target and a data use purpose.

FIG. 9 is a diagram illustrating a screen of an example of display content when a structured ID is edited.

FIG. 10 is a diagram illustrating an example of a display result when a registration button is pushed after an input to a wrapper definition portion and a substantive definition portion.

FIG. 11 is a diagram illustrating a screen of an example of a situation where definition is given using a setting again.

FIG. 12 is a flowchart illustrating an example of an information using process of using information from a control facility.

FIG. 13 is a flowchart illustrating a subroutine of transformation of identification information and a structured ID executed on information regarding the control facility in a control facility operation management device.

FIG. 14 is a flowchart illustrating an example of an information reflection process.

FIG. 15 is a flowchart illustrating an example of a measurement value transmission process.

FIG. 16 is a flowchart illustrating an example of an information using process from a sensor.

FIG. 17 is a flowchart illustrating an example of a structured ID addition, synthetization, and transformation process.

FIG. 18 is a flowchart illustrating an example of an information collection requesting process.

FIG. 19 is a flowchart illustrating an example of a control command transmission process.

FIG. 20 is a flowchart illustrating an example of structured ID edit preprocessing.

FIG. 21 is a flowchart illustrating an example of a structured ID edit process.

FIG. 22 is a flowchart illustrating an example of a structured ID edit process.

DESCRIPTION OF EMBODIMENTS

Hereinafter, an embodiment of the invention will be described in detail with reference to the drawings.

(1) Background of Embodiment of the Invention

According to an embodiment of the invention (hereinafter referred to as the present embodiment), as a prerequisite, a control facility operation management device first assigns identifiers to control facilities (also referred to as "field devices") which are management targets and associates information acquired from sensors or the like which are incidental facilities with the assigned identifiers to manage the control facilities.

For information necessary to manage the control facilities, a method of designing a database and storing information in the database for management is generally used in most cases. In these cases, since design of the database is necessary, the entire control system including a control device is implicitly assumed to be designed by one component provider (component vendor). In this case, SCADA or a business application that manages the control facilities uses a scheme of uniquely specifying location information of a database or information targeted by a query. According to such a scheme, necessity of provision of a control facility operation management device and a database integrally by one component provider easily occurs and it is easy for the control facility operation management device and the database to form a close relation, and thus there is concern of an easy change in a system configuration being difficult. Hereinafter, according to the present embodiment, forming close relevancy between the control facility operation management device and the database in this way is expressed as "close coupling". On the other hand, a structured query language (SQL) used for a database has freedom of expression. Therefore, when necessary syntactic analysis is executed, information regarding a management target can be uniquely specified whereas uniqueness may not be identified by simple text string comparison. Therefore, it is difficult to utilize SQL itself as identification information of each control facility.

Accordingly, in the present embodiment, as will be described in detail, control facilities that have different design timing or architecture (also referred to as "field devices") and incidental facilities such as sensors are encoded using uniquely identifiable identifiers, the plurality of identifiers are coupled, and uniqueness between the plurality of identifiers is guaranteed.

Further, in the present embodiment, a parent-child relation between the identifiers is constructed and the identifiers having the parent-child relation are coupled to mutually identify the plurality of control facilities and the incidental facilities using a tree structure representing the parent-child relation. When the identifiers are coupled, in the present embodiment, logic inclusion identification information (equivalent to wrapper identifiers to be described below) in which a control facility operation management device 700 or incidental facilities are modeled is structured to be interposed between the identifiers. The control facility operation management device manages combinations of the structured identifiers (equivalent to a "structured ID" to be described below) and information regarding the control facilities and incidental facilities that are management targets.

In the present embodiment, when a process is executed in response to a request for utilizing the management targets, by receiving the structured identifiers as described above, a physical location of the information regarding the management targets is specified based on the inclusion identification information, and the information regarding the management targets are consequently provided.

On the other hand, in the present embodiment, when a control command is issued to the control facilities or the incidental facilities that are management targets, the control facilities or the facilities incidental to the management target control facilities that are management targets are controlled via a control interface (hereinafter also abbreviated to an "IF") by receiving the structured identifiers from users and transmitting the structured identifiers to the target control facilities or the facilities incidental to the target control facilities or writing the control command on the control interface. Hereinafter, a concept of the invention will be described more specifically.

(2) First Embodiment (2-1) Entire Configuration of Control Facility Operation Management System FIG. 1 is a block diagram illustrating an overall configuration example of a control facility operation management system 1000 according to a first embodiment. Note that, in the following embodiments, same configurations to which same reference signs are given are the same configurations and same operations are executed in principle. Therefore, description thereof will be omitted.

The control facility operation management system 1000 is broadly divided into three kinds of systems, for example, a preservation source side system of a generation source of information acquired by the sensors in the control facilities, a user side system of the information, and the management device of the information. The preservation source side system of the information generation source, the management system of the information, and the user side system of the information are configured to be mutually connected via a network 400 to mutually exchange information.

(2-2) Preservation Source Side System of Information Generation Source

The control facility operation management system 1000 includes a database server 100, an IoT sensor (hereinafter also referred to as a "sensor") 200 which is an example of an incidental facility, and a control facility 300 (a field device) illustrated as the preservation source side system of the information generation source.

The database server 100 is a kind of computer similar to the control facility operation management device 700 and includes a memory 110, a recording medium interface (hereinafter abbreviated to an "IF") 130, and a communication interface 120. The memory 110 includes a database management service (hereinafter abbreviated to as a "DBMS") 111 and a command determination execution unit 112. In a recording medium 140, there is DB accumulation data 141. The database server 100 is a kind of computer and has a function of providing the DB accumulation data 141 to the corresponding control facility operation management device 700 in response to a control command from the control facility operation management device 700, as will be described below, using the foregoing internal function.

The IoT sensor 200 is an example of a facility incidental to the control facility and is a sensor that acquires a measurement value regarding at least one kind of measurement item. The IoT sensor 200 includes a communication interface 220 capable of transmitting sensor information including the measurement value acquired by the sensor to the network 400 and a memory 210. In the memory 210, a measurement value message generation unit 211 and a command determination execution unit 212 operate.

The control facility 300 is an example of a device used on a field side and is a control target device itself generally called as a main device in the control system. The control facility 300 includes, for example, a communication interface (hereinafter abbreviated to an "IF") 320, a measurement value message generation unit 311, and a command determination execution unit 312.

(2-3) User Side System of Information

The control facility operation management system 1000 serves as an user side system of information and includes a human machine interface (HMI) 500 and a business program execution server 600.

The HMI 500 is a computer as in the control facility operation management device 700, includes a communication IF 520, a CPU 550, and a memory 510, and is connected to a display device 580. The communication IF 520, the CPU 550, and the memory 510 are connected by an internal bus 560. In the memory 510, a setting item input unit 511, a structured ID wrapper operation unit 512, and a structured ID reading unit 514 operate, and a structured ID edit table 513 is provided.

The business program execution server (hereinafter also referred to as a "business server") 600 is a computer as in the control facility operation management device 700 and includes a communication IF 620, a CPU 650, and a memory 610. The communication IF 620, the CPU 650, and the memory 610 are connected by an internal bus 660. The memory 610 in the business server 600 includes a business application program (hereinafter also referred to as a "business application") 612 and a structured ID reading unit 614. The structured ID reading unit 614 has a function of taking combined accumulation data 773 of a structured ID of a management target and a data use purpose from a recording medium 771 via the control facility operation management device 700.

(2-4) Information Management System

The control facility operation management system 1000 serves as an information management system and includes the control facility operation management device 700 and the recording medium 771. In the control facility operation management device 700, a redundant configuration including two or more devices is generally adopted. To simplify the drawing, a configuration in which one device is adopted is exemplified in the illustrated example.

The control facility operation management device 700 is connected to an external system by a communication interface (hereinafter abbreviated to an "IF") 720 via the network 400. The control facility operation management device 700 includes a memory 710. Each function operating on the memory 710 can be realized as hardware by configuring a processing unit corresponding to each function as an integrated circuit.

Specifically, a structured ID wrapper management unit 711 that manages entire information of the management targets, a structured ID processing program management unit 712 that manages a relation between an information collection program and a command transmission program operating using the structured ID as an identifier and executes each program, a control system management key value store (KVS) data management area 713, and a combined data management area 714 are provided on the memory 710.

The control facility operation management device 700 includes a CPU 750. Each internal function executes a corresponding process when information, a command, and the like are delivered via the bus 760. Hereinafter, to simplify the description, processes of each control unit and each processing unit in the control facility operation management device 700 are assumed to be realized by programs loaded on memory. Each processing unit realized by executing each program by the CPU 750 is expressed as a main constituent of a process.

The control facility operation management device 700 includes a recording medium interface (hereinafter abbreviated to an "IF") 730 and writes data on the recording medium 771 or reads data stored in the reading medium 771 via the combined data management area 714. The recording medium 771 includes regions for recording combined accumulation data 772 of a structured ID and a wrapper, combined accumulation data 773 of a structure ID of a management target and a use purpose, combined accumulation data 774 of a structured ID of a management target and information collection program information, combined accumulation data 775 of a structured ID of a control target and command transmission program information, and combined accumulation data 776 of a structured ID of an abstraction target and processing program information.

(2-5) Definition Example of Structured ID

In particular, in an SI definition portion 772Aa, an abstract identifier designed by a system integrator is set. In the present embodiment, the SI definition portion 772Aa is represented as a name "existing definition quotation portion" as will be described below, when a set abstract identifier (definition of the set abstract identifier) is represented on a list.

Wrapper identifiers are set in the wrapper definition portion 772Ab and the wrapper definition portion 772Ac. The wrapper identifier is an identifier that is inserted between an abstract identifier of the earlier designed SI definition portion 772Aa and an identifier indicating a specific component provider of substantive definition portions 772Ad and 772Ae adopted next to logically couple the abstract identifier with the identifiers indicating the specific component provider. To have no influence on the system structure by inserting the wrapper identifier, the wrapper identifier and the substantive identifier are associated basically in a one-to-one manner.

FIG. 2 is a conceptual diagram illustrating definition of a structured ID so that consistency of the entire range of a system configuration can be managed. In the present embodiment, since a plurality of identifiers having different design timing are handled, encoding is executed by flexibly coupling each identifier. "Encoding" in the present embodiment mainly means that identifiers are coupled to form a tree structure.

The structured ID is configured such that an abstract identifier representing a "system entire ID" that symbolizes the entire management targets is set as a root element (a parent element: high-order element) and substantive identifiers (child elements: low-order elements) serving as more specific identifiers than representing substantive components such as control facilities in field, facilities incidental to the control facilities, or the like are coupled with the abstract identifier in consideration of replacement of a part of the system configuration.

In the present embodiment, in the structured ID, a wrapper identifier modeled by logically including control facilities or facilities incidental to the control facilities corresponding to substantive identifiers so that relations with the component providers disappear is inserted between the above-described abstract identifier and the substantive identifiers.

As an illustrated first tree structure, the SI definition portion 772Aa, the wrapper definition portion 772Ab, and the substantive definition portion 772Ad have an aspect that the wrapper definition portion 772Ab is added while the SI definition portion 772Aa and the substantive definition portion 772Ad are coupled and maintain a one-to-one relation previous and subsequent of the wrapper definition portion 772Ab. This is an aspect used when information limiting the substantive definition portion 772Ad is added using the wrapper definition portion 772Ab.

The SI definition portion 772Aa, the wrapper definition portion 772Ac, and the substantive definition portion 772Ae as a second tree structure have an aspect that a tree structure is defined by a wrapper identifier of the wrapper definition portion 772Ac that defines a parent-child relation previous and subsequent of the substantive definition portion 772Ae and the wrapper definition portion 772Ac while a one-to-one relation between an abstract identifier of the SI definition portion 772Aa and a substantive identifier of the substantive definition portion 772Ae is maintained.

The second tree structure is an aspect used when an identifier of the entire redundant system and identifiers of a plurality of internal elements realizing the redundant system are defined. This means that two substantive identifiers (equivalent to a hexagon and a rhombus illustrated) corresponding to products of two storage devices are respectively coupled to two wrapper identifiers (equivalent to two pentagons illustrated) with a double system configuration in the definition 772Ae of component provider B company.

FIG. 3 is a diagram illustrating an example of a table 772 managing combined accumulation data 772A of structured IDs and wrapper identifiers. In the illustrated example, three kinds of definition portions, the SI definition portion 772Aa, the wrapper definition portions 772Ab and 772Ac, and the substantive definition portions 772Ad and 772Ae, are distinguished from each other and are configured so that an intention of a user during setting can be checked, as will be described below. Each line represents content corresponding to input content set for an identifier by the user.

Combinations of the abstract identifier of the SI definition portion 772Aa (equivalent to an existing definition quotation portion to be described below) and the substantive identifiers of the substantive definition portions 772Ad and 772Ae are used to manage control facilities and facilities incidental to the control facilities having different design timing by the same scheme irrespective of the design timing. In the present embodiment, the combinations of these identifiers are appropriately changed flexibly to be combined and coupled also with the wrapper identifiers, and thus are encoded as structured IDs using the concept illustrated in FIG. 2.

In line 7721, a wrapper identifier such as "thermometer model A" in the wrapper definition portions 772Ab and 772Ac is coupled with a substantive identifier such as "A company thermometer" in the substantive definition portion 772Ad.

In line 7722, a wrapper identifier such as "plant model A" in the wrapper definition portions 772Ab and 772Ac is coupled with a substantive identifier such as "A company plant" in the substantive definition portion 772Ad.

Here, the "model" in the wrapper definition portion 772Ab, for example, means a concept for unifying a unit of pressure, temperature such as Celsius or Fahrenheit, or the like or unifying an expression aspect of sensor information from the IoT sensor 200 as the above-described incidental facility.

In line 7723, as in the above-described line 7721, a wrapper identifier such as "thermometer model A" as the wrapper definition portions 772Ab and 772Ac is inserted between the abstract identifier of the SI definition portion 772Aa and the substantive identifiers of the substantive definition portions 772Ad and 772Ae so that the previous and subsequent identifiers are coupled.

In the present embodiment, an abstraction program is set to, for example, model the substantive identifier such as "A company thermometer" in the substantive definition portions 772Ad and 772Ae to "thermometer model A" of the wrapper definition portions 772Ab and 772Ac, such as "D company thermometer" in line 7723.

FIGS. 4(A) to 4(C) illustrate examples of the structured IDs configured by coupling the abstract identifier of the SI definition portion 772Aa, the wrapper identifiers of the wrapper definition portions 772Ab and 772Ac, and the substantive identifiers of the substantive definition portions 772Ad and 772Ae in a tree structure, as described above.

FIG. 4(A) illustrates an example of a structured ID (hereinafter also referred to as an "existing structured ID") 772AA1 used previously. FIGS. 4(B) and 4(C) illustrate respectively examples of the structured IDs expressed as a regular expression using a mark "*" (hereinafter referred to as a "wild card") partially in the existing structured ID to reuse the existing structured ID illustrated in FIG. 4(A).

Here, the "regular expression" refers to, for example, an expression form of the structured ID obtained by altering partial expression of the original structured ID using the wild card "*" to separate and reuse the wrapper identifiers of the wrapper definition portions 772Ab and 772Ac and the substantive identifiers in the substantive definition portions 772Ad and 772Ae in the existing structured ID.

The existing structured ID 772AA1 illustrated in FIG. 4(A) includes a wrapper identifier "thermometer model B" and a substantive identifier "B company thermometer" set by a request from the user. The above-described abstraction processing program can extract only the wrapper identifier "thermometer model B" to be used for searching as a regular expression by replacing the substantive identifier such as "B company plant/device B" as illustrated in FIG. 4(A) with the wild card "*", as illustrated in FIG. 4(B), based on the wrapper identifiers of the wrapper definition portions 772Ab and 772Ac among the existing structured ID 772AA1.

An expression such as "thermometer model" is an expression that conceptualized a structured ID using "thermometer" which is a substantive component provided by various component providers as a logic model and is referred to as a "regular expression" in the present embodiment. When such a regular expression is used, the substantive component "thermometer" can be handled similarly as "thermometer model" when provided by any component provider.

In the present embodiment, some kinds of identifiers can be copied and reused partially utilizing the previously used structured ID by selecting only the wrapper identifier expressed in the regular expression, and a similar structured ID can be generated efficiently by coupling another new identifier with the substantive identifiers. In the present embodiment, generation of such a structured ID is also expressed as "definition".

When the number of wrapper identifiers (in the illustrated example, "plant model B") included in the regular expression decreases as in a structured ID 772AA3 formed as the regular expression illustrated in FIG. 4(C), identifiers of branch elements (other identifiers that can be selected as relative parents (high-order side)) or identifiers of leaf elements (other identifiers that can be selected as relative children (low-order side)) corresponding to a tail portion "*" of the regular expression increase in kinds. Therefore, kinds of identifiers which can be reused in a lump increase.

FIG. 5 illustrates a relation among a wrapper definition portion 776a, a substantive definition portion 776b, and a processing program 776c in the combined accumulation data 776 of the structured ID of the abstraction target and the processing program information.

In the combined accumulation data 776, for example, a unit system transformation program that executes unit transformation, an abstraction processing program that associates individual features of the component providers of each company component with the wrapper identifier of the wrapper definition portion 776a, and a program that associates individual failure messages set by each component provider with meanings indicated by failure models of the wrapper identifier 776a are registered.

A first line field 7761 indicates definition in which the substantive identifier "A company plant" in the substantive definition portion 776b is abstracted and associated with the wrapper identifier "plant model A" in the wrapper definition portion 776a by the abstraction processing program A.

A second line field 7762 indicates definition in which the substantive identifier "D company thermometer" in the substantive definition portion 776b is abstracted and associated with the wrapper identifier "temperature model A" in the wrapper definition portion 776a by the unit transformation program A.

A third line field 7763 indicates definition in which the substantive identifier "failure IDα" in the substantive definition portion 776b is abstracted and associated with the wrapper definition identifier "failure model A" in the wrapper definition portion 776a by the failure severity determination program A.

A fourth line field 7764 indicates definition in which the substantive identifier "failure IDβ" in the substantive definition portion 776b is abstracted and associated with the wrapper definition identifier "failure model B" in the wrapper definition portion 776a by the failure severity determination program B.

The above-described combined accumulation data 776 is read by the structured ID reading unit 514 during design so that, an "existing use method" of the wrapper definition portion 776a, the substantive definition portion 776b, and the processing program 776c is referred to. In the combined accumulation data 776 of the structured ID of the abstraction target and the processing program information described above, the "existing use method" can be set as necessary.

Similarly, in the wrapper definition portion 776a and the processing program 776c, the registered existing use method is referred to by searching for the combined accumulation data 776 based on the substantive definition portion 776b. On the other hand, a new "existing use method" is registered as necessary. According to this configuration, it is possible to reduce a load on a designer and define a new "existing use method" while a know-how combination is reused.

FIG. 6 illustrates the combined accumulation data 774 of a structured ID of a management target and information collection program information. The combined accumulation data 774 includes a structured ID column 774a of the management target and an information collection program column 774b as items and a correspondent relation therebetween is managed.

By managing the correspondent relation in this way, a data user using the HMI 500 and the business program execution server 600 can handle information using the structured ID since the data user is released from use of programs while considering various information generation sources, location of a database, and the like.

In line 7741, a query program to the control device is registered. As an example of the query program, a program corresponding to a protocol of the measurement value message generation unit 311 of the control facility 300 is registered.

In line 7742, a DB query SQL execution program is registered. As an example of the SQL execution program, a program that acquires information from the DB accumulation data 141 of the database server 100 is registered. This program has, for example, a function of transforming the structured ID into a query to the DBMS 111 of the database server 100 and executing a query.

In line 7743, an IoT sensor information stream program is registered. As an example of the IoT sensor information stream program, a program that transforms the structured ID into an information collection protocol to the IoT sensor 200 and executes a query is registered.

FIG. 7 illustrates combined accumulation data 775 of a structured ID of a control target and command transmission program information. In the combined accumulation data 775, a correspondent relation between a structured ID 775a of the control target and a command transmission program 775b is managed. By managing the correspondent relation, it is possible to execute control according to the name of the command transmission program 775b.

When the structured ID of the control target is received from the user, the structured ID processing program management unit 712 of the control facility operation management device 700 specifies a control command corresponding to the received structured ID with reference to the above-described combined accumulation data 775 and activates the command transmission program 775b to transmit the control command to the control facility 300 as a control target.

In a first line 7751, a control command transmission program that transmits a control command to a control facility is registered and a program corresponding to a protocol of the command determination execution unit 312 of the control facility 300 is registered.

In a second line 7752, a DB writing SQL execution program that registers information in the DB accumulation data 141 included in the database server 100 is registered. As an example of the DB writing SQL execution program, a program that transforms a structured ID into a query to the DBMS 111 of the database server 100 and executes the query is registered.

In a third line 7753, an IoT sensor operation change program is registered. As an example of the IoT sensor operation change program, a program that transforms a structured ID into an operation change protocol to the IoT sensor 200 and controls a control facility is registered.

FIG. 8 illustrates an example of the combined accumulation data 773 of a structured ID of target information and a structured ID of a data use purpose. The combined accumulation data 773 includes a structured ID 773a of target information and structured ID data 773b of a data use purpose.

When the structured ID is updated in the control facility operation management device 700, the combined accumulation data 773 is referred to for searching a notification destination to be notified of the update in real time to the HMI 500 and the business program execution server 600 that are users of the structured ID of the target information.

FIG. 9 illustrates an example of a screen 580A displayed on the display device 580 when the structured ID is edited. The screen 580A is displayed on the display device 580 when the structured ID is edited utilizing the setting item input unit 511 in the HMI 500.

The screen 580A includes an existing definition quotation portion 580Aa in which an existing structured ID is displayed as a menu as a selection form of a so-called drop-down type. In the existing definition quotation portion 580Aa, a list display portion 580Ab in which structured ID groups with existing structured IDs of different length coupled and registered, as described above, is displayed as a list. This screen 580A includes a wrapper definition portion 580Ac and a substantive definition portion 580Ad as an input form.

Further, the screen 580A includes, as design support functions, a button 580Ae in which text "View description information of existing definition" for referring to a purpose of the structured ID selected in the existing definition quotation portion 580Aa is represented and also includes a registration button 580Af for deciding and setting an identifier represented in the input form. When the button 580Ae is pushed, the information illustrated in FIG. 8 can be referred to. On the other hand, when the registration button 580Af is pushed, the information is registered as the information illustrated in FIG. 3.

FIGS. 10(A) and 10(B) illustrate examples of results displayed when the registration button 580Af is pushed after an input to the wrapper definition portion 580Ac and the substantive definition portion 580Ad, respectively.

When the wrapper identifier of the wrapper definition portion 580Ac is included in the identifier selected in the existing definition quotation portion 580Aa or when the identifier input to the substantive definition portion 580Ad is identical to one wrapper identifier among all the previously registered wrapper identifiers when the registration button 580Af is pushed, a message 580Ba indicating that registration failed is displayed consequently without registering the foregoing wrapper identifier 580Ac as in a screen 580B illustrated in FIG. 10(A) to guarantee uniqueness of the structured ID and prevent self-similarity definition.

On the other hand, when guarantee of uniqueness and the prevention of the self-similarity definition is checked, a message 580Cb indicating success of the registration of the wrapper identifier 580Ac is displayed as in a screen 580C illustrated in FIG. 10(B).

FIG. 11 illustrates an example of a screen 580D representing a definition method by reusing a structured ID and a setting associated with the structured ID. The screen 580D represents an example of a situation defined by reusing the structured ID and the setting associated with the structured ID, for example, when a system integrator selects a structured ID among the existing structured IDs represented in a wrapper definition portion 580Dc and partially corrects a substantive identifier indicated in a substantive definition portion 580Dd according to the structured ID.

The above-described structured ID reading unit 514 searches for the structured ID edit table 513 based on a selected configuration model using selection of the configuration model in a system configuration model 580Dg currently being copied and defined as an opportunity and displays the existing structured ID corresponding to the configuration model in the existing definition quotation portion 580Da, the wrapper definition portion 580Dc, and a substantive definition portion 580Db.

The wrapper definition portion 580Dc is an input form of information that has no need of change. On the other hand, the substantive definition portion 580Dd is an input form of information for changing definition to a copy destination identifier.

A button 580De is a button that is pushed when the description information of the existing definition is referred to. Specifically, the button 580De is, for example, a button that is pushed when information for checking a purpose of the structured ID being selected in the existing definition quotation portion 580Da is referred to. A repetition button 580Df is a button that is pushed during registration in the structured ID edit table 513 to update the above-described selection form and the information of the input form.

(2-6) Operation Management Method

FIG. 12 is a flowchart illustrating an example of an information using process of using information from the control facility 300. In the information using process, the HMI 500 and the business program execution server 600 which are data user sides jointly use information from the control facility 300.

The HMI 500 is an example of a device on a side using information transmitted by a push type communication method from the control facility 300 set as a management target of the control facility operation management device 700 in the control facility operation management system 1000. The push type means a form of spontaneous transmission from a side acquiring information.

In the control facility 300, the measurement value message generation unit 311 transmits a measurement value message including measurement values and identifiers to the control facility operation management device 700 (step S1001).

Subsequently, in the control facility 300, a processing program corresponding to a communication protocol executes a transformation process (a structured ID transformation process) illustrated in FIG. 13 as a subroutine in which the identifiers and structured IDs of the protocol for the control facility 300 in the control facility operation management device 700 are transformed (step S1002).

Thus, the plurality of measurement values can be identified using the corresponding structured ID, and the control facility operation management device 700 executes the abstraction processing program specified using each structured ID and executes an information reflection process (see FIG. 14) of reflecting information to the wrapper identifier by the abstraction processing program (step S1003).

Thereafter, the control facility operation management device 700 executes a measurement value transmission process (see FIG. 15) of transmitting the measurement values to the HMI 500 and the business program execution server 600 (step S1004).

FIG. 13 illustrates an example of the structured ID transformation process illustrated in FIG. 12. Specifically, a program capable of processing the communication protocol of the control facility 300 (hereinafter referred to as a "communication protocol processing program") transforms identification information (equivalent to the identifier) and the structured ID of a protocol for the control facility 300 in the control facility operation management device 700.

The communication protocol processing program transforms the identification information (identifier) received from the control facility 300 into the structured ID (step S1002A). Subsequently, the communication protocol processing program writes the measurement values received together on the control system management KVS data management area 713 (step S1002B).

Thereafter, the communication protocol processing program forms the structured ID as an event and shares the structured ID in the control facility operation management device 700 (step S1002C). Through such a process, the communication protocol of a message of any control facility 300 can correspond to an operation management method using the structured ID.

FIG. 14 illustrates an example of the information reflection process illustrated in FIG. 12. In the information reflection process, for example, execution of the abstraction processing program and information reflection to the wrapper in the control facility operation management device 700 are executed.

The structured ID processing program management unit 712 searches for the combined accumulation data 776 of the structured ID of the abstraction target and the processing program information managed in the recording medium 771 by the combined data management area 714 via the recording medium IF 730 based on reception of the event message of the structured ID shared in the control facility operation management device 700 (step S1003A). The structured ID processing program management unit 712 executes a program corresponding to the search result (the "abstraction processing program" is exemplified) (step S1003A).

Subsequently, in the control facility operation management device 700, the abstraction processing program writes the measurement values on the control system management KVS data management area 713 (step S1003B). In the control facility operation management device 700, the structured ID which is an updating target is shared with other devices (step S1003C).

FIG. 15 illustrates an example of the measurement value transmission process illustrated in FIG. 12. In the measurement value transmission process, for example, the measurement value message is transmitted from the control facility operation management device 700 to the HMI 500 and the business program execution server 600.

In the control facility operation management device 700, a transmission program searches for the combined accumulation data 773 of the structured ID of the management target and the data use purpose stored in the combined data management area 714 based on the structured ID shared in the control facility operation management device 700 (step S1004A).

The transmission program transmits the measurement value message according to a purpose indicated by the structured ID and the purpose information to the HMI 500 and the business program execution server 600 (step S1004B).

FIG. 16 illustrates an example of an information using process of using sensor information from the IoT sensor 200. In the information using process, an example of sharing the information between the HMI 500 and the business program execution server 600 that uses the sensor information by the push type communication method from the IoT sensor 200 which is a management target of the control facility operation management device 700 is illustrated.

In the control facility operation management device 700, a processing program corresponding to the communication protocol of the IoT sensor 200 adds a new structured ID to avoid collision of IDs with the structured ID granted to the IoT sensor 200.

In the IoT sensor 200, the measurement value message generation unit 211 transmits the measurement value message including the measurement values and the structured ID to the control facility operation management device 700 (step S1005). In the control facility operation management device 700 which is a reception side, a processing program corresponding to a protocol for the IoT sensor 200 executes an addition and synthetization process of adding the new structured ID to the existing structured ID and synthesizing (step S1006).

The new structured ID is added and synthesized in this way online using, for example, the Internet. Here, the reason why the new structured ID is processed in this way is that there is limitation on a buffer size or a text string size in which the identifiers can be stored on the side of the IoT sensor 200 in some cases or it is necessary to execute a process in an environment in which many pieces of information of a remote management center and the like are aggregated in some cases.

When the addition and synthetization of the new structured ID ends, the information becomes capable of processing based on the structured ID. Therefore, the IoT sensor 200 executes the information reflection process (step S1003) and the measurement value transmission process (step S1004) and transmits the information to the HMI 500 and the business server 600 which are users of the information using the push type communication method.

FIG. 17 illustrates an example of the structured ID addition and synthetization process illustrated in FIG. 16. In the control facility operation management device 700, a sensor processing program corresponds to the communication protocol with the IoT sensor 200 and synthesizes a plurality of structured IDs by adding a structured ID for collision avoidance to the structured ID granted to the IoT sensor 200.

Specifically, first, the sensor processing program executes the synthetization by extracting the structured ID corresponding to the communication protocol used with the IoT sensor 200 and adding the new structured ID of a parent element for collision avoidance to the structured ID (step S1006A).

Subsequently, in the control facility operation management device 700, the sensor processing program writes the measurement value based on the measurement result on the control system management KVS data management area 713 (step S1006B). Thereafter, the sensor processing program shares the structured ID with other devices in the control facility operation management device 700 (step S1006C).

FIG. 18 illustrates an example of an information requesting process of collecting information. In the information requesting process, the HMI 500 and the business program execution server 600 on the side using the information request information collection at necessary timing.

The HMI 500 and the business program execution server 600 transmits a request message including a target structured ID as an information collection request to the control facility operation management device 700 (step S1007).

In the control facility operation management device 700 which is a reception side, the structured ID processing program management unit 712 searches for the above-described combined accumulation data 774 of the structured ID of the management target and the information collection program information based on the structure ID included in the received request message and executes a program corresponding to the search result (step S1008).

With regard to output sources of information, the DBMS 111 in the database server 100, the command determination execution unit 212 in the IoT sensor 200, and the command determination execution unit 312 in the control facility 300 each transmit target information to the control facility operation management device 700 in response to an information collection command which is a command causing the incidental facilities to collect information (step S1009).

The control facility 300 and the IoT sensor 200 each transmit the information using the above-described push type communication method. In the database server 100, target information is acquired by executing a process equivalent to a remote procedure call in response to the information collection request to the DBMS 111. After the structured ID is granted, the above-described information reflection process (step S1003) and measurement value transmission process (step S1004) are executed as in the push type communication method.

FIG. 19 is a flowchart illustrating an example of a process of transmitting a control command by the HMI 500 and the business program execution server 600.

The HMI 500 and the business program execution server 600 each transmit a request message including the structured ID of the management target as a request for control command transmission to the control facility operation management device 700 (step S1010).

In the control facility operation management device 700 which is a reception side of the request message, the structured ID processing program management unit 712 searches for the combined accumulation data 775 of the structured ID of the control target and the command transmission program information of the combined data management area 714 based on the structured ID included in the received request message and executes a program (the "command transmission program" is exemplified) corresponding to the search result (step S1011). The command transmission program transmits a control command to the database server 100, the IoT sensor 200, and the control facility 300.

On the control target side, when the control command transmitted by the command transmission program is received, the DBMS 111 in the database server 100, the command determination execution unit 212 in the IoT sensor 200, and the command determination execution unit 312 in the control facility 300 execute an operation based on the control command (step S1012).

FIG. 20 illustrates an example of structured ID edit preprocessing. In the structured ID edit preprocessing, an example of the preprocessing when designing the structured ID by operating the structured ID edit screen 580A is illustrated.

The HMI 500 executes a login process on the control facility operation management device 700 using a user identification number input by the user according to a function of the setting item input unit 511 (step S1501).

On the other hand, the structured ID wrapper management unit 711 transmits the combined accumulation data 772 of the structured ID and the wrapper which is data designed and generated by the user to the structured ID reading unit 514 based on the user identification number (step S1502).

Subsequently, the structured ID reading unit 514 records the structured ID in the received combined accumulation data 772 of the structured ID and the wrapper in the structured ID edit table 513 (step S1503).

Next, the structured ID wrapper operation unit 512 reads the structured ID from the structured ID edit table 513 and registers definition indicating a relation with the structured ID in the existing definition quotation unit 580Aa (see FIG. 9) (step S1504). Thus, it is ready for the user to define the structured ID.

FIG. 21 is a flowchart illustrating an example of the structured ID edit process. In the structured ID edit process, an example of a process when the user operates the structured ID edit screen 580A and sets the structured ID is illustrated.

The setting item input unit 511 receives input content from the user regarding the wrapper definition portion 580Ac and the substantive definition portion 580Ad in the structured ID edit screen 580A (see FIG. 9) (step S1505).

The setting item input unit 511 receives the input content from the user unless the registration button 580Af is pushed (NO in step S1506). Conversely, when the registration button 580Af is pushed (YES in step S1506), the structured ID wrapper operation unit 512 transmits a combination of information selected from a list in the existing definition quotation unit 580Aa and information of the wrapper definition portion 580Ac and the substantive definition portion 580Ad to the structured ID wrapper management unit 711 to request checking of uniqueness in the combination of the information (step S1507).

When uniqueness is not guaranteed (NO in step S1508), the structured ID wrapper operation unit 512 receives a message indicating registration failure from the structured ID wrapper management unit 711 and displays a message 580Bb indicating registration failure (step S1509). Thereafter, the setting item input unit 511 receives an input from the user by the structured ID edit screen 580A (see FIG. 9) again.

Conversely, when uniqueness is guaranteed (YES in step S1508), the structured ID wrapper operation unit 512 receives a message indicating registration success from the structured ID wrapper management unit 711 and displays a message 580Ba indicating registration success on the display device 580 (step S1510).

FIG. 22 illustrates an example of the structured ID edit process. In the structured ID edit process, for example, the user generates a new structured ID by extracting and partially copying only the wrapper identifier in the existing structured ID by the structured ID edit screen 580D and selecting a substantive identifier of difference and defining a structured ID of difference.

In this setting method, the preprocessing illustrated in FIG. 21 is executed in advance. Thereafter, the structured ID wrapper operation unit 512 reads the structured ID from the structured ID edit table 513 and generates information in which the substantial identifier is transformed into the regular expression using the wild card "*" (step S1511). Further, the structured ID wrapper operation unit 512 sets definition of the information generated in this way in an existing definition quotation unit 580Dg (step S1511).

When selection of the existing definition quotation unit 580Dg from the user is received, the structured ID wrapper operation unit 512 searches for the structured ID edit table 513 using the selected regular expression and further sorts the corresponding structured IDs in a shorter order (step S1512). In this way, it is possible to define differences from the sequentially shorter structured IDs and set the corrected substantive identifiers while reflecting the corrected substantive identifiers in the longer structured IDs.

To execute the repeated difference definition, the setting item input unit 511 displays the existing definition in the existing definition portion 580Da, the wrapper definition portion 580Dc, and the substantive definition portion 580Dd in the shorter order of the structured IDs and receives a new input to the substantive definition portion 580Dd from the user (step S1513).

When a repetition setting button is not pushed (NO in step S1514), a new input to the substantive definition portion 580Dd from the user (see FIG. 11) is received (step S1513).

Conversely, when the repetition setting button is pushed (YES in step S1514), the structured ID wrapper operation unit 512 checks whether the substantive identifiers newly input to the substantive definition portion 580Dd overlap with all the wrapper identifiers registered in the structured ID edit table 513, that is, whether uniqueness is guaranteed (step S1515). In the following description, checking whether uniqueness is guaranteed means checking whether a checking target identifier is registered in the table.

When uniqueness is not guaranteed (NO in step S1516), the structured ID wrapper operation unit 512 receives a new input to the substantive definition portion 580Dd (see FIG. 11) from the user (step S1513) again. Conversely, when uniqueness is guaranteed (YES in step S1516), the structured ID wrapper operation unit 512 edits the structured ID edit table 513 using the substantive identifiers newly input to the substantive definition portion 580Dd illustrated in FIG. 11 and deletes the structured ID excluded from an edit target (step S1517).

When the sequentially defined structured ID is not defined up to the longest structured ID (NO in step S1518), the structured ID wrapper operation unit 512 repeatedly displays the next long structured ID in the existing definition portion 580Da, the wrapper definition portion 580Dc, and the substantive definition portion 580Dd and receives a new input to the substantive definition portion 580Dd from the user (step S1513).

Conversely, when the structured ID is defined up to the longest structured ID (YES in step S1518), the structured ID wrapper operation unit 512 transmits the edited definition remaining in the structured ID edit table 513 to the structured ID wrapper management unit 711 to request checking of uniqueness (step S1519).

When uniqueness is not guaranteed (NO in step S1520), the structured ID wrapper operation unit 512 receives a message indicating registration failure from the structured ID wrapper management unit 711 and displays registration failure part on the display device 580 (step S1521).

Conversely, when uniqueness is guaranteed (YES in step S1520), the structured ID wrapper operation unit 512 receives a message indicating registration success from the structured ID wrapper management unit 711 and displays a fact 580Ba indicating registration success (S1522). Thus, it is possible to normally guarantee uniqueness between the plurality of structured IDs.

(3) Advantageous Effects or the Like of Present Embodiment

In the control facility operation management device 700 according to the present embodiment, as described above, the structured ID wrapper management unit 711 which is an example of an identification information management unit manages physical and logic inclusion relations of each constituent element including a control facility and an incidental facility that form a system as pieces of structured identification information (equivalent to the structured ID) represented by a tree structure including each piece of logic inclusion identification information associated with each piece of configuration information (equivalent to each identifier) indicating each of the constituent elements, and manages uniqueness between each piece of structured identification information.

The combined data management area 714 which is an example of a combination management unit manages a combination of each application program corresponding to each of the constituent elements and each piece of logic inclusion identification information (equivalent to a wrapper identifier) corresponding to each piece of configuration information indicating each of the constituent elements in a storage region of the recording medium 771 via the recording medium IF 730. The structured ID processing program management unit 712 which is an example of a program execution unit gives a query to the combined data management area 714 in response to a request involving one piece of logic inclusion identification information to acquire one piece of structured identification information including one piece of logic inclusion identification information, specifies one application program based on one constituent element corresponding to one piece of structured identification information, and executes the specified one application program.

In this way, when a request for one piece of configuration information is received, the structured ID processing program management unit 712 queries to the recording medium 771 via the combined data management area 714. The combined data management area 714 is capable of specifying one piece of structured identification information including one piece of configuration information in the request among the plurality of pieces of structured identification information. The structured identification information includes logic inclusion identification information which is logically coupled with the one piece of configuration information and the logic inclusion identification information has a so-called regular expression indicating an inclusion relation by logical coupling which does not depend on each supply source of the plurality of constituent elements. Therefore, structured identification information is information with which one constituent element corresponding to the one piece of configuration information can be specified regardless of the supply source. Accordingly, the structured ID processing program management unit 712 can execute an application program in response to the above-described request and corresponds to one constituent element corresponding to the above-described one piece of configuration information, regardless of the supply source of the plurality of constituent elements such as control facilities or facilities incidental to the control facilities. In this way, it is possible to flexibly control the constituent elements such as the control facilities or the facilities incidental to the control facilities without being conscious of the supply source. In this way, it is possible to solve close coupling between a database and business applications using the database as in the related art, and a selection range of the control facilities or the facilities incidental to the control facilities expands, thus it is possible to select field devices more flexibly.

According to the present embodiment, the combined data management area 714 which is an example of a combination management unit manages combined data of one constituent element and each information collection program acquiring a measurement value by one constituent element corresponding to one piece of structured identification information via the recording medium IF 730 and executes one information collection program as the specified one application program in response to a request including one logic inclusion identification information. In this way, even when a certain component provider provides a facility (equivalent to the IoT sensor 200) incidental to the control facility as a component on the field side, it is not necessary for the side of the control facility operation management device 700 to be conscious of a difference in the component by controlling by using one piece of structured identification information including one piece of logic inclusion identification information (wrapper identifier). Thus, it is possible to easily manage operation of the control facilities and the facilities incidental to the control facilities.

According to the present embodiment, the combined data management area 714 manages combined data of each command transmission program and each piece of structured identification information that transmits control command to each of the constituent elements corresponding to each piece of structured identification information via the recording medium IF 730. The program execution unit executes one information command transmission program as the specified one application program in response to a request including one piece of logic inclusion identification information. In this way, the side of the control facility operation management device 700 can execute the application program controlling the control facilities and the facilities incidental to the control facilities without being conscious of a difference in the component.

According to the present embodiment, the combined data management area 714 manages combined data of each piece of logic inclusion identification information and a use purpose of target information of each of the constituent elements corresponding to the piece of logic inclusion identification information. The structured ID processing program management unit 712 executes one target program corresponding to the use purpose as the specified one application program in response to a request including one piece of logic inclusion identification information. In this way, the side of the control facility operation management device 700 can execute the application program using target information of the control facilities and the facilities incidental to the control facilities without being conscious of a difference in the component.

According to the present embodiment, the structured ID wrapper management unit 711 manages, as each piece of structured identification information, structured identification information of a name of a fixed finite model and structured identification information to which a name is able to be granted according to amounting state in a one-to-one relation. The structured ID wrapper management unit 711 resets information of structured identification information to which a name is able to be granted according to the mounting state as information of structured identification information to which the name of the fixed finite model is granted, to be recognized as the finite model again and realize control. In this way, the information of the structured identification information to which a name can be granted according to the mounting state can be used instead of the structured identification information of the name of the fixed finite model.

According to the present embodiment, the structured ID wrapper management unit 711 defines new structured identification information by generating structured identification information of a regular expression on condition of only the name of the fixed finite model and differentially defining only structured identification information to which a name is able to be granted according to mounting which has a one-to-one relation with the name of the fixed finite model in existing structured identification information corresponding to the structured identification information of the regular expression. In this way, it is possible to reduce a labor for generating new structured identification information.

According to the present embodiment, when one piece of structured identification information to be set in one constituent element among the constituent elements is not unique, the structured ID wrapper management unit 711 adds new structured identification information and resets new structured identification information to correspond to one constituent element. In this way, it is possible to handle the control facilities or the facilities incidental to the control facilities in the field side normally using unique structured identification information.

(4) Operation Management System According to Second Embodiment

An operation management system according to a second embodiment has a function of publicizing the above-described setting or circulating the setting as a commodity by utilizing the search function using the regular expression in the operation management device 700 according to the first embodiment.

The structured ID wrapper management unit 711 has a function of searching for a plurality of settings (and similarity between the settings) managed as a part of the combined accumulation data 772 of the structured ID and the wrapper identifier. Further, the structured ID wrapper management unit 711 transmits information regarding the plurality of settings (and the similarity between the settings) as the search result to the HMI 500. In the HMI 500, the structured ID reading unit 514 receives the information regarding the plurality of settings (and the similarity between the settings) and displays on the display device 580. Thus, it is possible to introduce the plurality of settings publicized as a commodity to a user who is an operator via the HMI 500.

In this configuration, it is not necessary for the user side to manually input every desired settings as the user side is provided with the settings of high similarity with the desired settings. Therefore, it is possible to improve efficiency of setting work and further guarantee time consumed by operation management of constituent elements such as control facilities and incidental facilities to that extent.

(5) Operation Management System According to Third Embodiment

An operation management system according to a third embodiment has a function of registering a substantive component satisfying a request including a wrapper identifier corresponding to the substantive component as a commodity in response to the request and circulating the substantive component by utilizing the search function using the regular expression in the operation management device 700 according to the first embodiment.

A component provider is a vendor that manufactures and provides a substantive component such as a server device or a sensor device which is a constituent element such as a control facility or an incidental facility.

In the control facility operation management device 700, the structured ID wrapper management unit 711 searches for definition of a wrapper identifier of high affinity with a component provided by the control facility operation management device 700 through a search function using the regular expression of the design screen 580D. The structured ID wrapper management unit 711 purchases or circulates registered definitions by registering or releasing as a commodity the definitions as a substantive component appropriate for the wrapper identifier. During release, the structured ID wrapper management unit 711 sets, as a condition, the fact that a pre-decided condition of charge is satisfied.

In the operation management system according to the third embodiment which has a configuration in which, in addition to the control facility operation management device 700 according to the first embodiment, a HMI 500 or a business program execution server 600 serving as a user side device requesting structured identification information is included, the structured ID wrapper management unit 711 of a similarity search execution unit in the control facility operation management device 700 compares the structured identification information requested by the above-described user side device to the plurality of pieces of managed structured identification information and examines similarity therebetween. As a result, when there is specific structured identification information similar to the structured identification information requested by the user side device in the plurality of pieces of managed structured identification information, the structured ID wrapper management unit 711 which is an example of an information introduction unit permits disclosure of the specific structured identification information to the user side device on condition of charge.

In this configuration, prices are different between component providers in some cases despite being the definition of the same structured identification information, and thus it is possible to extend choices of the user side to which the substantive components are provided.

(6) Other Embodiments

The foregoing embodiments are merely examples used to describe the invention and the invention is not limited to these embodiments. The invention can be modified in various forms without departing from the gist of the invention. For example, in the foregoing embodiments, the processes of various programs have been described sequentially, but the invention is not limited thereto. Accordingly, the order of the processes may be switched or the processes may operate in parallel unless there is no contradiction in processing results.

INDUSTRIAL APPLICABILITY

The invention can broadly be applied to an operation management device, an operation management method, and an operation management system managing control facilities included in a system and facilities incidental to the control facilities.

REFERENCE SIGNS LIST

100: database server
111: DBMS
112, 212, 312: command determination execution unit
141: DB accumulation data
200: IoT sensor
211, 311: measurement message generation unit
300: control facility
400: network
500: HMI
580: display device
511: setting item input unit function
512: structured ID wrapper operation unit
513: structured ID edit table
514: structured ID reading unit
600: business program execution server
614: structured ID reading unit
612: business application
700: control facility operation management device
720, 120, 220, 320, 520, 620: communication IF
760, 560, 660: bus
710, 110, 210, 510, 610: memory
711: structured ID wrapper management unit
712: structured ID processing program management unit
713: control system management KVS data management area
714: combined data management area
750, 550, 650: CPU
730, 130: recording medium IF
771, 140: recording medium
772: combined accumulation data of structured ID and wrapper
773: combined accumulation data of structured ID of data use type and purpose information
774: combined accumulation data of structured ID of management target and information collection program information
775: combined accumulation data of structured ID of control target and command transmission program information
776: combined accumulation data of structured ID of abstraction target and processing program information
1000: control facility operation management system

The invention claimed is:

1. An operation management device comprising:
an identification information management unit that manages physical and logic inclusion relations of constituent elements including control facilities and incidental facilities that form a system as respective pieces of structured identification information represented by a tree structure including each piece of logic inclusion identification information associated with each piece of configuration information indicating each of the constituent elements, and manages uniqueness between the pieces of structured identification information;
a combination management unit that manages a combination of each application program corresponding to each of the constituent elements and the each piece of logic inclusion identification information corresponding to the each piece of constituent information indicating each of the constituent elements; and
a program execution unit that gives a query to the combination management unit in response to a request including one piece of logic inclusion identification information to acquire one piece of structured identification information including the one piece of logic inclusion identification information, specifies one application program based on one constituent element corresponding to the one piece of structured identification information, and executes the specified one application program,
wherein when one piece of structured identification information to be set in one constituent element among the each of constituent elements is not unique, the identification information management unit adds new structured identification information and resets the new structured identification information to correspond to the one constituent element.

2. The operation management device according to claim 1, wherein
the combination management unit manages combined data of each information collection program in which a measurement value by one constituent element corresponding to the one piece of structured identification information is acquired and the one constituent element, and
the program execution unit executes one information collection program as the specified one application program in response to a request including the one piece of logic inclusion identification information.

3. The operation management device according to claim 1, wherein
the combination management unit manages combined data of each command transmission program in which a control command is transmitted to each of the constituent elements corresponding to the each piece of structured identification information and the each piece of structured identification information, and
the program execution unit executes one information command transmission program as the specified one application program in response to a request including the one piece of logic inclusion identification information.

4. The operation management device according to claim 1, wherein
the combination management unit manages combined data of the each piece of logic inclusion identification information and a use purpose of target information of the each of constituent elements corresponding to the each piece of logic inclusion identification information, and
the program execution unit executes one target program corresponding to the use purpose as the specified one application program in response to a request including the one piece of logic inclusion identification information.

5. The operation management device according to claim 1, wherein
the identification information management unit manages, as the each piece of structured identification information, structured identification information of a name of a fixed finite model and structured identification information to which a name is able to be granted according to a mounting state in a one-to-one relation, and
the identification information management unit resets information of structured identification information to which a name is able to be granted according to the mounting state as information of structured identification information to which the name of the fixed finite model is granted, to be recognized as the finite model again and realize control.

6. The operation management device according to claim 5, wherein
the identification information management unit defines new structured identification information by generating structured identification information of a regular expression on condition of only the name of the fixed finite model and differentially defining only structured identification information to which a name is able to be granted according to mounting which has a one-to-one relation with the name of the fixed finite model in existing structured identification information corresponding to structured identification information of the regular expression.

7. An operation management method of executing:
an identification information management step of managing physical and logic inclusion relations of constituent elements including control facilities and incidental facilities that form a system as respective pieces of structured identification information represented by a tree structure including each piece of logic inclusion identification information associated with each piece of configuration information indicating each of the constituent elements, and managing uniqueness between the pieces of structured identification information, by an identification information management unit;
a combination management step of managing a combination of each application program corresponding to each of the constituent elements and the each piece of logic inclusion identification information corresponding to the each piece of constituent information indicating each of the constituent elements, by a combination management unit; and
a program execution step of giving a query to the combination management unit in response to a request including one piece of logic inclusion identification information to acquire one piece of structured identification information including the one piece of logic inclusion identification information, specifying one application program based on one constituent element corresponding to the one piece of structured identification information, and executing the specified one application program, by a program execution unit,
wherein in the identification information management step, when one piece of structured identification information to be set in one constituent element among the each of constituent elements is not unique, the identification information management unit adds new structured identification information and resets the new structured identification information to correspond to the one constituent element.

8. The operation management method according to claim 7, wherein
in the combination management step, the combination management unit manages combined data of each information collection program in which a measurement value by one constituent element corresponding to the one piece of structured identification information is acquired and the one constituent element, and
in the program execution step, the program execution unit executes one information collection program as the specified one application program in response to a request including the one piece of logic inclusion identification information.

9. The operation management method according to claim 7, wherein
in the combination management step, the combination management unit manages combined data of each command transmission program in which a control command is transmitted to each of the constituent elements corresponding to the each piece of structured identification information and the each piece of structured identification information, and
in the program execution step, the program execution unit executes one information command transmission program as the specified one application program in response to a request including the one piece of logic inclusion identification information.

10. The operation management method according to claim 7, wherein
in the combination management step, the combination management unit manages combined data of the each piece of logic inclusion identification information and a use purpose of target information of the each of constituent elements corresponding to the each piece of logic inclusion identification information, and
in the program execution step, the program execution unit executes one target program corresponding to the use purpose as the specified one application program in response to a request including the one piece of logic inclusion identification information.

11. The operation management method according to claim 7, wherein
in the identification information management step, the identification information management unit manages, as the each piece of structured identification information, structured identification information of a name of a fixed finite model and structured identification information to which a name is able to be granted according to a mounting state in a one-to-one relation, and
the identification information management unit resets information of structured identification information to which a name is able to be granted according to the mounting state as information of structured identification information to which the name of the fixed finite model is granted, to be recognized as the finite model again and realize control.

12. The operation management method according to claim 11, wherein
in the identification information management step, the identification information management unit defines new structured identification information by generating structured identification information of a regular expression on condition of only the name of the fixed finite model and differentially defining only structured identification information to which a name is able to be granted according to mounting which has a one-to-one relation with the name of the fixed finite model in existing structured identification information corresponding to structured identification information of the regular expression.

13. An operation management system comprising:
an operation management device including:
an identification information management unit that manages physical and logic inclusion relations of constituent elements including control facilities and incidental facilities that form a system as respective pieces of structured identification information represented by a tree structure including each piece of logic inclusion identification information associated with each piece of configuration information indicating each of the constituent elements, and manages uniqueness between the pieces of structured identification information, a combination management unit that manages a combination of each application program corresponding to each of the constituent elements and the each piece of logic inclusion identification information corresponding to the each piece of constituent information indicating each of the constituent elements, and a program execution unit that gives a query to the combination management unit in response to a request including one piece of logic inclusion identification information to acquire one piece of structured identification information including the one piece of logic inclusion identification information, specifies one application program based on one constituent element corresponding to the one piece of structured identification information, and executes the specified one application program; and a user side device that requests structured identification information, wherein the identification information management unit includes:

a similarity search execution unit that compares the structured identification information requested by the user side device to the plurality of pieces of managed structured identification information and examines similarity therebetween, and an information introduction unit that permits disclosure of the specific structured identification information to the user side device on condition of charge when there is the specific structured identification information similar to the structured identification information requested by the user side device among the plurality of pieces of managed identification information as a result of searching by the similarity search execution unit, wherein when one piece of structured identification information to be set in one constituent element among the each of constituent elements is not unique, the identification information management unit adds new structured identification information and resets the new structured identification information to correspond to the one constituent element.

* * * * *